United States Patent
Hersam et al.

(10) Patent No.: US 10,702,803 B2
(45) Date of Patent: Jul. 7, 2020

(54) LAYER-BY-LAYER SORTING OF RHENIUM DISULFIDE VIA HIGH-DENSITY ISOPYCNIC DENSITY GRADIENT ULTRACENTRIFUGATION

(71) Applicant: Northwestern University, Evanston, IL (US)

(72) Inventors: Mark C. Hersam, Wilmette, IL (US); Joohoon Kang, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 192 days.

(21) Appl. No.: 15/800,666

(22) Filed: Nov. 1, 2017

(65) Prior Publication Data

US 2018/0117502 A1 May 3, 2018

Related U.S. Application Data

(60) Provisional application No. 62/496,897, filed on Nov. 1, 2016.

(51) Int. Cl.
| | |
|---|---|
| *B01D 21/26* | (2006.01) |
| *B03D 3/00* | (2006.01) |
| *B01D 21/28* | (2006.01) |
| *C01G 47/00* | (2006.01) |

(52) U.S. Cl.
CPC .......... *B01D 21/26* (2013.01); *B01D 21/283* (2013.01); *B03D 3/00* (2013.01); *C01G 47/00* (2013.01); *C01P 2002/82* (2013.01); *C01P 2002/85* (2013.01); *C01P 2004/02* (2013.01); *C01P 2004/04* (2013.01); *C01P 2004/20* (2013.01); *C01P 2004/30* (2013.01); *C01P 2004/61* (2013.01); *C01P 2006/10* (2013.01); *C01P 2006/40* (2013.01); *C01P 2006/60* (2013.01)

(58) Field of Classification Search
CPC .............................. B05D 21/26; B05D 21/283
See application file for complete search history.

(56) References Cited

U.S. PATENT DOCUMENTS

| | | | |
|---|---|---|---|
| 9,114,405 B2 | 8/2015 | Green et al. | |
| 9,221,064 B2 | 12/2015 | Hersam et al. | |
| 2005/0074747 A1 | 4/2005 | Arap et al. | |
| 2011/0037033 A1* | 2/2011 | Green | B03D 3/00 252/510 |
| 2016/0016796 A1 | 1/2016 | Hersam et al. | |

FOREIGN PATENT DOCUMENTS

| | | |
|---|---|---|
| WO | 2006010070 A2 | 1/2006 |
| WO | 2015036868 A2 | 3/2015 |
| WO | 2016074683 A1 | 5/2016 |

OTHER PUBLICATIONS

Kang et al. "Layer-by-Layer Sorting of Rhenium Disulfide via High-Density Isopycnic Density Gradient Ultracentrifugation" (Oct. 2016).*

(Continued)

*Primary Examiner* — Austin Murata
(74) *Attorney, Agent, or Firm* — Locke Lord LLP; Tim Tingkang Xia, Esq.

(57) ABSTRACT

Separation of rhenium disulfide nanomaterials and related fluid density gradient media.

28 Claims, 22 Drawing Sheets
(21 of 22 Drawing Sheet(s) Filed in Color)

(56) References Cited

OTHER PUBLICATIONS

Kang, J. et al., "Layer-by-layer sorting of rhenium disulfide via high-density isopycnic density gradient ultracentrifugation", Nano Letters, Oct. 4, 2016, vol. 16, pp. 7216-7223.
Green, A. et al., "Solution phase production of graphene with controlled thickness via density differentiation", Nano Lett., 9, 4031-4036, 2009.
Sun, X. et al., "Monodisperse chemically modified graphene obtained by density gradient ultracentrifugal rate separation", ACS Nano, 4, 3381-3389, 2010.
Kang, J. et al., "Thickness sorting of two-dimensional transition metal dichalcogenides via copolymer-assisted density gradient ultracentrifugation", Nat. Comm., 5, 5478, 2014.
Backes, C. et al., "Edge and confinement effects allow in situ measurement of size and thickness of liquid-exfoliated nanosheets", Nat. Comm., 5, 4576, 2014.
Zhu, J. et al., "Solution-processed dielectrics based on thickness-sorted two-dimensional hexagonal boron nitride nanosheets", Nano Lett., 15, 7029, 2015.
Zhu, J. et al., "Layer-by-layer assembled 2D montmorillonite dielectrics for solution-processed electronics", Adv. Mater., 28, 63, 2016.
International Search Report and Written Opinion for PCT/US2017/059548 dated Jan. 23, 2018, 16 pages.

\* cited by examiner

Before annealing

Annealing at 100 °C for 10 min

Iod-F68

Iod+CsCl
F68

Iod+CsCl
SC

LAYER-BY-LAYER SORTING OF RHENIUM DISULFIDE VIA HIGH-DENSITY ISOPYCNIC DENSITY GRADIENT ULTRACENTRIFUGATION

This application claims priority to and the benefit of application Ser. No. 62/496,897 filed Nov. 1, 2016, the entirety of which is incorporated herein by reference.

This invention was made with government support under DMR-1505849 and DMR-1121262 awarded by the National Science Foundation; and N00014-14-1-0669 awarded by the Office of Naval Research. The government has certain rights in the invention.

BACKGROUND OF THE INVENTION

Two-dimensional (2D) nanomaterials present unique structures and properties for ultrathin electronic and optoelectronic device applications. Recently, rhenium disulfide ($ReS_2$), one of the semiconducting transition metal dichalcogenides (TMDCs), has been shown to have an unusual distorted IT structure with random stacking and weak interlayer coupling. Unlike other TMDCs, such as molybdenum or tungsten disulfide whose bandgaps transition from indirect to direct in the monolayer limit, $ReS_2$ possesses a direct bandgap in the bulk and as a monolayer, which provides advantages in high-gain photodetector applications. While its band structure remains qualitatively unchanged as a function of thickness, $ReS_2$ does show a subtle layer-dependent photoluminescence (PL) blue-shift due to quantum confinement effects.

Previous work has shown that $ReS_2$ nanosheets can be isolated by micromechanical and chemical exfoliation methods. Although micromechanical exfoliation provides high-quality nanosheets, lack of scalability presents serious limitations for real-world applications. Conversely, while chemical exfoliation can produce larger quantities of nanosheets, this process drives a phase transition that necessitates subsequent thermal treatments to attempt to recover the original $ReS_2$ phase.

Liquid-phase exfoliation (LPE) is an alternative, scalable route for isolating 2D nanomaterials without chemical modifications. LPE can yield large quantities of 2D nanomaterials, but ultimately lacks control over structural parameters such as thickness. The structural polydispersity of LPE dispersions is known to introduce numerous problems, particularly in electronic and optoelectronic applications, thus motivating efforts to develop post-exfoliation, solution-based separation methods. Towards this end, isopycnic density gradient ultracentrifugation (iDGU), has been adapted to nanomaterial dispersions including carbon nanotubes and low-density 2D nanomaterials to improve structural and electronic monodispersity. Thus far, this technique has been limited to nanomaterials with buoyant densities in aqueous surfactant solutions lower than the standard density gradient medium iodixanol ($\rho_{max}$=1.32 g/cm³). With a buoyant density as high as $\rho_{max}$=1.9 g/cm cesium chloride (CsCl) would appear to be a natural candidate to extend the density range of iDGU. However, with a significantly lower viscosity than iodixanol, density gradients based on CsCl are relatively unstable, which hinders its utility for nanomaterial separations.

SUMMARY OF THE INVENTION

In light of the foregoing, it is an object of the present invention to provide a method and/or a fluid density gradient medium useful in conjunction with the sorting of high-density nanomaterials, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide a general methodology for sorting high-density nanomaterials via density gradient ultracentrifugation.

It can be another object of the present invention to provide a density gradient medium with a buoyant density greater than the buoyant density of a high-density nanomaterial introduced thereto, for use with isopycnic density gradient ultracentrifugation.

It can also be an object of the present invention, alone or in conjunction with one or more of the preceding objectives, to provide a method for effective solution processing and sorting of rhenium disulfide nanomaterials.

Other objects, features, benefits and advantages of this invention will be apparent from the following summary and descriptions of certain embodiments, and will be readily apparent to those skilled in the art having knowledge of various nanomaterial sorting methodologies and density gradient media used therewith. Such objects, features, benefits and advantages will be apparent from the above as taken into conjunction with the accompanying examples, data, figures and all reasonable inferences to be drawn therefrom.

In part, the present invention can be directed to a method for separating rhenium disulfide nanomaterials by thickness and/or layer number. Such a method can comprise centrifuging a rhenium disulfide nanomaterial composition in contact with an aqueous fluid medium comprising a density gradient and an adjuvant component providing such a medium a buoyant density greater than the buoyant density of such a rhenium disulfide nanomaterial composition, wherein such a nanomaterial composition can comprise one or more surface active components and a polydisperse population of planar rhenium disulfide nanomaterials with respect to thickness and having a mean or average thickness on the order of nanometers, or as can be considered to comprise monolayer, bilayer, trilayer and n-layer rhenium disulfide nanomaterials, where n can be an integer in the range of 4 to about 10; and separating such a rhenium disulfide nanomaterial composition into two or more separation fractions each of which can comprise a subpopulation of planar rhenium disulfide nanomaterials from the polydisperse population, wherein such a subpopulation in at least one of the two or more separation fractions can comprise nanomaterials having a mean/average thickness less than that of the polydisperse population, or as can be greater than about 50% of the monolayer rhenium disulfide nanomaterials, bilayer rhenium disulfide nanomaterials and/or trilayer rhenium disulfide nanomaterials or combinations thereof. In certain non-limiting embodiments, such a rhenium disulfide nanomaterial composition can be provided by first sonicating a rhenium disulfide material in a fluid medium comprising one or more surface active components. Regardless, such a subpopulation in at least one of the two or more separation fractions can comprise greater than about 50% of the monolayer or bilayer rhenium disulfide nanomaterials, or a combination thereof.

More generally, the present invention can also be directed to a method of using an increased buoyant density limit for separating planar nanomaterials by thickness. Such a method can comprise providing a composition comprising a nanomaterial and one or more surface active components, such a composition as can comprise a polydisperse population of planar nanomaterials comprising monolayer, bilayer, trilayer and n-layer nanomaterials, where n can be an integer selected from 4- about 10, such a composition having a buoyant density; providing an aqueous fluid medium comprising a density gradient, such a medium having a maximum buoyant density; introducing a component to such a fluid medium, such a component having a maximum density limit greater than such a composition buoyant density, to provide such a medium a buoyant density greater than such a composition buoyant density; centrifuging such a nanomaterial composition in contact with such an aqueous fluid medium; and separating such a nanomaterial composition into two or more separation fractions, each of which as can comprise a subpopulation of planar nanomaterials, from such a polydisperse population, wherein such a subpopulation of planar nanomaterials in at least one of the two or more separation fractions can comprise a greater population of such monolayer nanomaterials, bilayer nanomaterials or a combination thereof as compared to adjacent separation fractions. In certain embodiments, such a composition can comprise a nanomaterial comprising rhenium disulfide. In certain such embodiments, planar nanomaterials can comprise mono- and bilayer rhenium disulfide nanomaterials.

Regardless, in certain non-limiting embodiments, the one or more surface active components can comprise a compound having a planar organic group. In certain such embodiments, such a surface active component can be sodium cholate. Regardless, such a rhenium disulfide nanomaterial composition can be centrifuged in an aqueous fluid medium comprising iodixanol and an adjuvant component such as but not limited to cesium chloride.

In certain embodiments, such a method can comprise removing such a fluid medium and the one or more surface active components from a subpopulation of planar rhenium disulfide nanomaterials in at least one such separation fraction. Such subpopulation(s) can then be deposited on a substrate, such a substrate as can then be incorporated into an electronic device.

In part, the present invention can also be directed to a fluid density gradient medium comprising iodixanol and an adjuvant component having a density and in an amount sufficient to provide such a medium with a buoyant density greater than the buoyant density of iodixanol. In certain non-limiting embodiments, such a component can be cesium chloride. Accordingly, such a fluid density gradient medium can comprise iodixanol and cesium chloride in an amount sufficient to provide such a medium with a buoyant density greater than the density of a nanomaterial introduced thereto. Without limitation, such a fluid density gradient medium can have a buoyant density greater than the density of a rhenium disulfide nanomaterial introduced thereto.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DETAILED DESCRIPTION OF CERTAIN EMBODIMENTS

As can relate to certain non-limiting embodiments, the present invention can be directed to the exfoliation and layer-by-layer iDGU sorting of high-density $ReS_2$ in aqueous surfactant solutions, using density gradient media based on mixtures of iodixanol and CsCl that combine the high viscosity of iodixanol with the high buoyant density of CsCl. Successful layer-dependent separation of $ReS_2$ by iDGU is confirmed with a variety of characterization methods including atomic force microscopy (AFM), Raman spectroscopy, and PL spectroscopy. Solution-processed $ReS_2$ thin films are also shown to provide a photocurrent response that is consistent with optical absorbance and PL spectra. Overall, this invention provides a scalable means for producing optoelectronically functional $ReS_2$ nanosheets with well-defined thicknesses in a manner that can be generalized to other high-density nanomaterials.

Figure 1A:
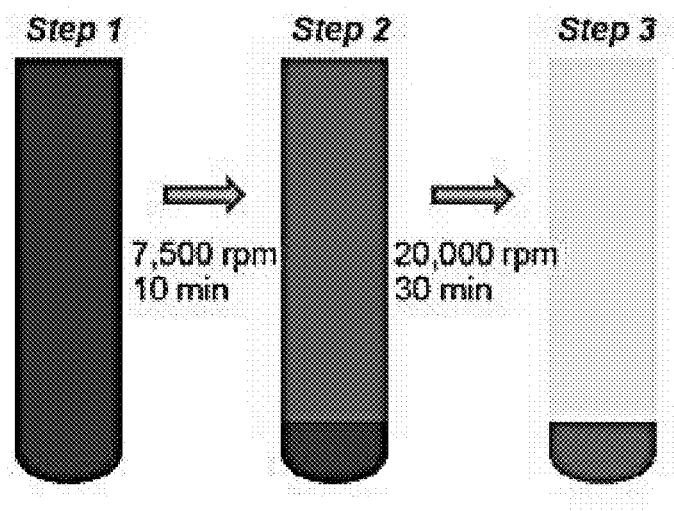
FIG. 1A-I. (A) Experimental procedure to enrich few-layer $ReS_2$ nanosheets (digital images). $ReS_2$ powder is exfoliated in water with 2% w/v sodium cholate (SC) using tip ultrasonication (step 1) and then centrifuged at 7,500 rpm for 10 min to remove unexfoliated $ReS_2$ powder (step 2). The supernatant is subsequently collected and ultracentrifuged at 20,000 rpm for 30 min to sediment large nanosheets (step 3). The sediment is finally redispersed in water with 2% w/v SC. (B) Optical absorbance spectrum of the resulting $ReS_2$ aqueous dispersion with a peak at 811 nm. Inset: photograph of the as-prepared $ReS_2$ dispersion with the schematic illustrating $ReS_2$ nanosheets surrounded by SC. (C) Atomic force microscopy (AFM) image of solution-processed $ReS_2$ following deposition on a Si wafer. (D) A schematic of the atomic structure of $ReS_2$ (blue: Re atom; yellow: S atom; red dotted line: Re chain direction). (E) A transmission electron microscopy (TEM) image of a $ReS_2$ nanosheet and a high-resolution TEM (HRTEM) image. The red arrow indicates the direction of a Re chain. (F) Selected area electron diffraction (SAED) pattern of a $ReS_2$ nanosheet. X-ray photoelectron spectroscopy (XPS) data for the (G) Re 4f and (H) S 2p core levels. (I) Raman spectrum of $ReS_2$ nanosheets.
Figure 1B:
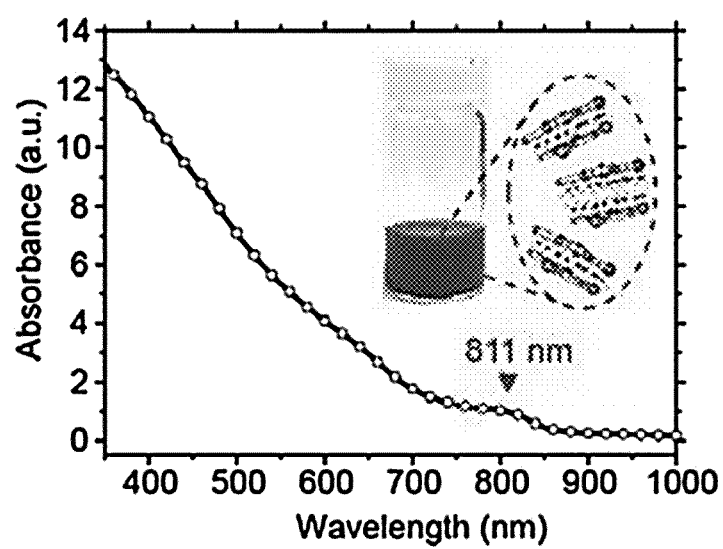
Figure 1C:
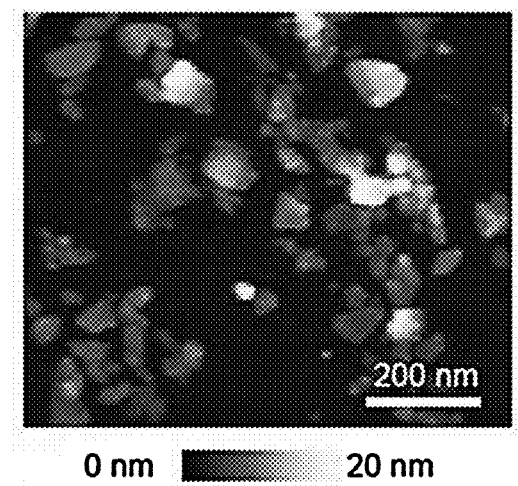

FIG. 1A schematically illustrates preparation of $ReS_2$ aqueous dispersions. Initially, $ReS_2$ powder is exfoliated via ultrasonication in deionized water with the amphiphilic small molecule surfactant sodium cholate (SC). The resulting dispersion is then centrifuged at 7,500 rpm to remove unexfoliated $ReS_2$ powder, and then further ultracentrifuged at 20,000 rpm to collect nanosheets with relatively large lateral sizes. The resulting optical absorbance spectrum is provided in FIG. 1B, which shows a peak at 811 nm that is consistent with the PL emission position from previous literature reports. As-prepared $ReS_2$ dispersions are dark brown in color (FIG. 1B, inset). In FIG. 1C, an atomic force microscopy (AFM) image of the solution-processed $ReS_2$ nanosheets on Si confirms the $ReS_2$ nanosheet morphology and the mechanical integrity of the dispersed flakes. For reference, a schematic of the $ReS_2$ atomic structure is provided in FIG. 1D, with the Re atoms (blue), S atoms (yellow), and Re chain direction (red arrow) indicated.

Figure 1D:
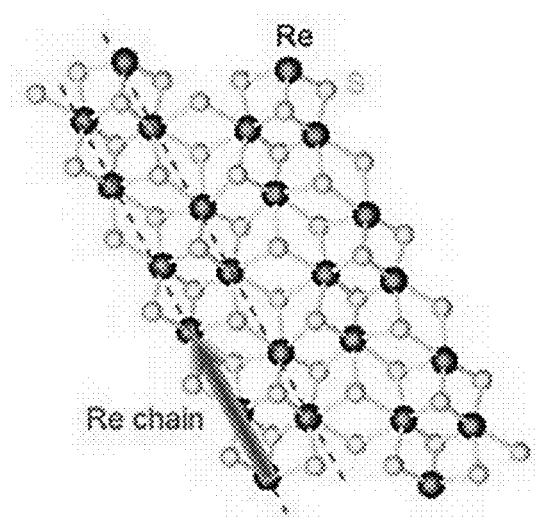
Figure 1E:
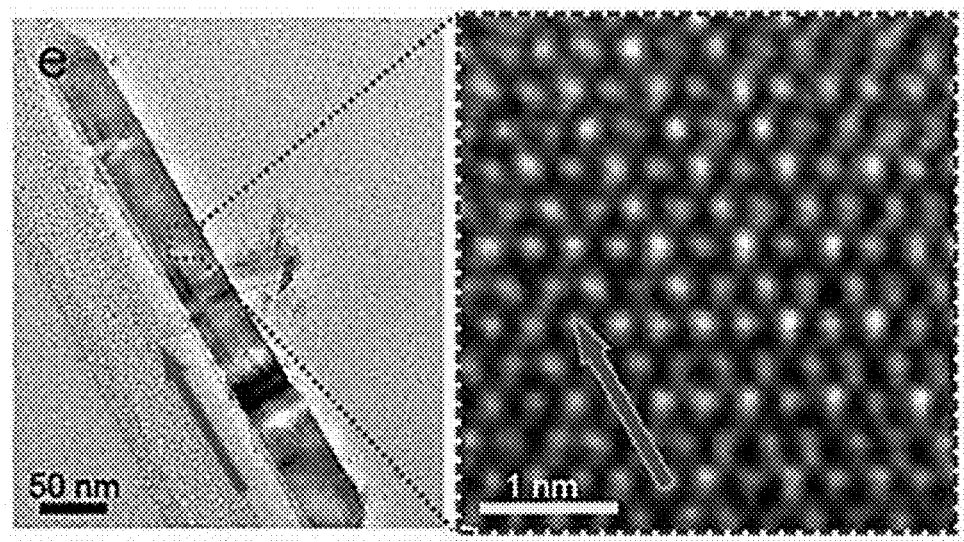
Figure 1F:
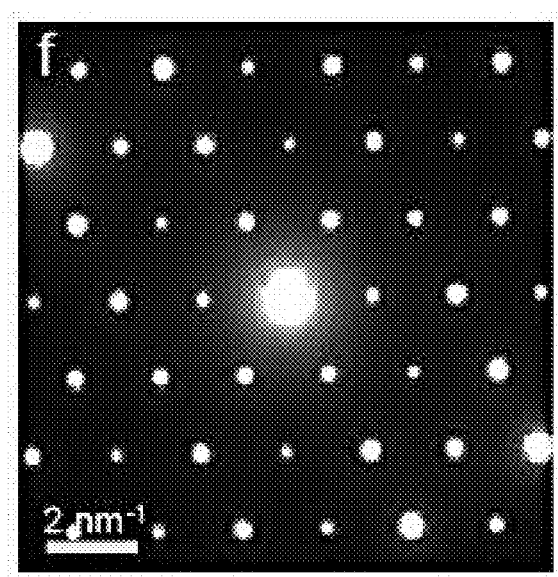

The $ReS_2$ structure of FIG. 1D is verified with atomic-scale characterization by transmission electron microscopy (TEM). Specifically, a droplet of $ReS_2$ solution is deposited onto holey carbon TEM grids for bright-field and high-resolution TEM (HRTEM) analysis. FIG. 1E shows a low-resolution TEM image of a $ReS_2$ nanosheet accompanied by a magnified HRTEM image. These images show a cleavage direction along the Re chains, which is consistent with literature precedent. (See, e.g., Lin, Y. C.; Komsa, H. P.; Yeh, C. H.; Bjorkman, T.; Liang, Z. Y.; Ho, C. H.; Huang, Y. S.; Chiu, P. W.; Krasheninnikov, A. V.; Suenaga, K. *ACS Nano* 2015, 9, 11249-11257.) Furthermore, in FIG. 1F, the expected $ReS_2$ crystal structure is confirmed with selected area electron diffraction (SAED), thus showing that the solution-processed $ReS_2$ nanosheets maintain their original crystalline nature without phase transformations.

Figure 1G:
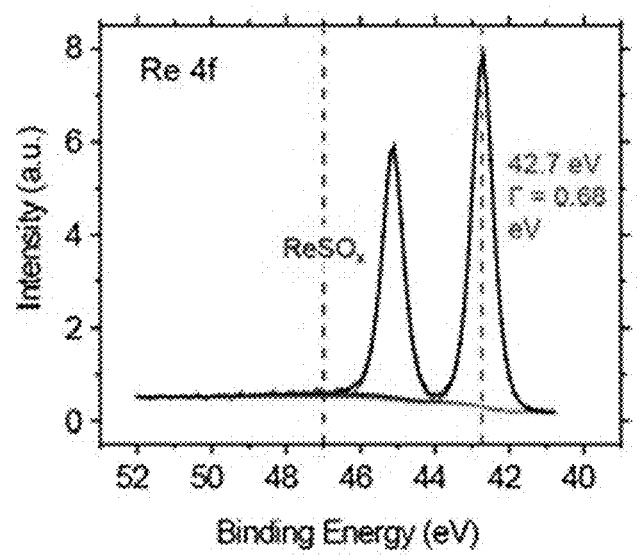
Figure 1H:
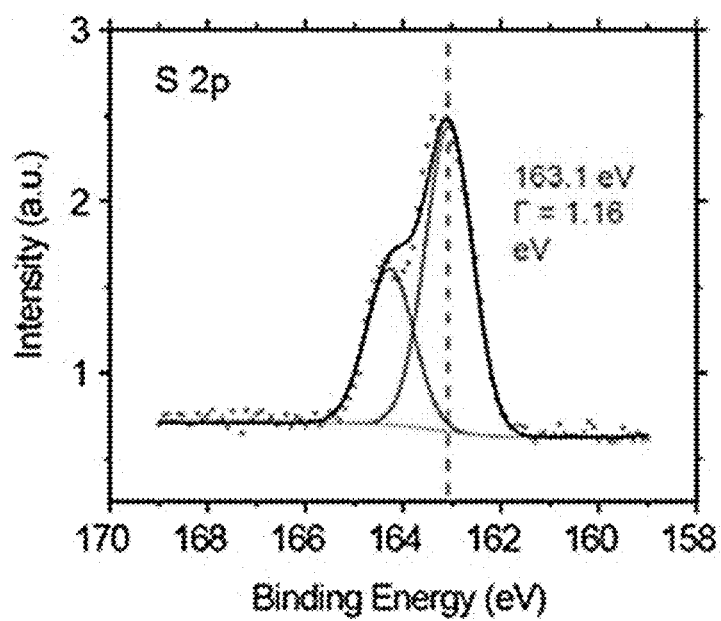
Figure 1I:
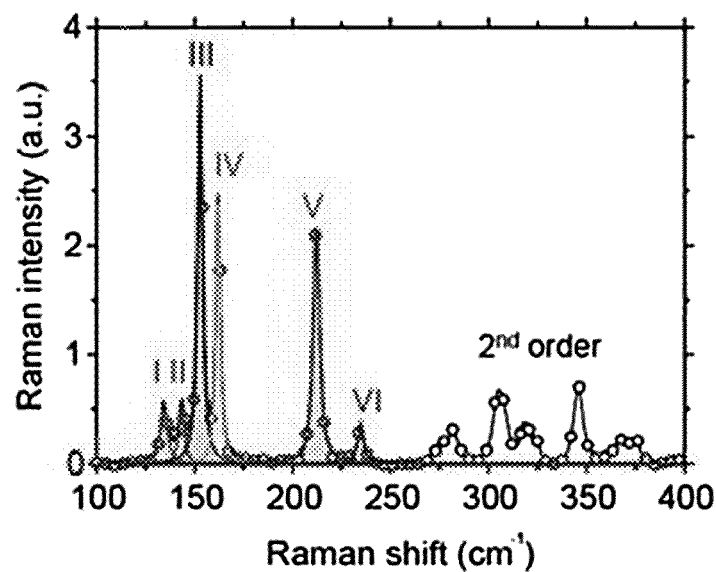
Figure 2A:
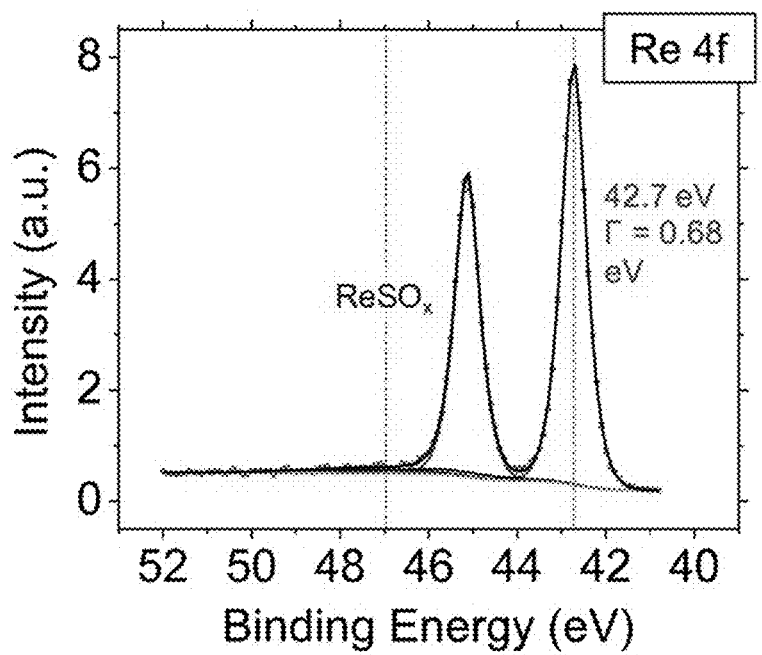
FIGS. 2A-B. (A) Reference X-ray photoelectron spectroscopy (XPS) data for the Re 4f core level (FIG. 1G). (B) Depth profiling confirms that the 42.7 eV Re $4f_{7/2}$ peak is related to $ReS_2$, since ion depth profiling preferentially removes S, giving rise to metallic $ReS_{2-x}$.
Figure 2B:
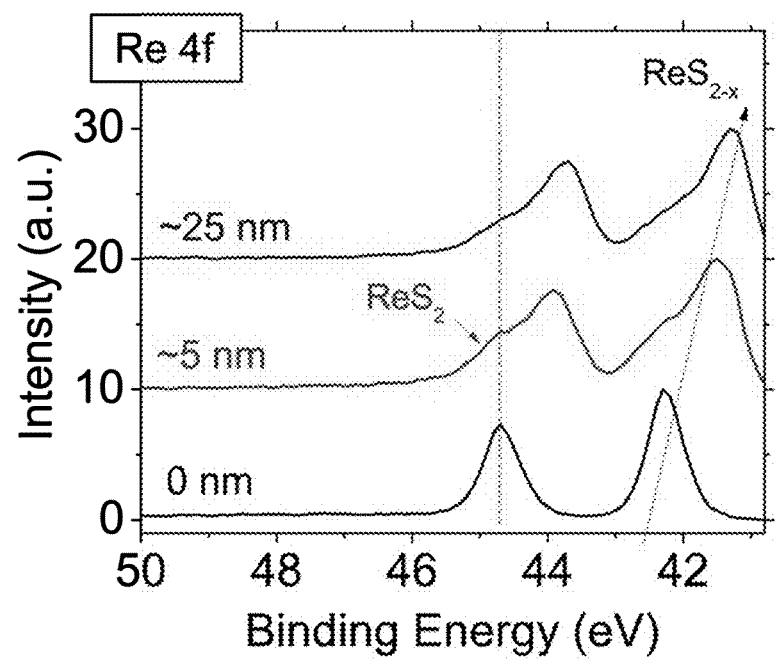

The chemical state of the $ReS_2$ nanoflakes are probed with X-ray photoelectron spectroscopy (XPS). Core level XPS spectra for Re 4F (FIG. 1G) and S 2p (FIG. 1H) show Re $4f_{7/2}$ and S $2p_{3/2}$ subbands at 42.7 eV and 163.1 eV, respectively, which are close to the expected values for bulk $ReS_2$. (Depth-profiled XPS measurements, presented in FIG. 2, corroborate the existence of unoxidized $ReS_2$.) A Raman spectrum taken on solution-processed $ReS_2$ is presented in FIG. 1I, where six Raman modes (labeled I to VI) are observed at ~137 cm$^{-1}$, ~145 cm$^{-1}$, ~153 cm$^{-1}$, ~163 cm$^{-1}$, 215 cm$^{-1}$, and ~238 cm$^{-1}$, respectively. These modes further confirm the integrity of the solution-processed $ReS_2$ nanoflakes and correspond to $E_g$-like (I to IV) and $A_g$-like (V and VI) vibrations.

The semiconducting direct bandgap nature of $ReS_2$ is investigated in FIG. 3. In particular, FIG. 3A shows a PL spectrum (532 nm excitation) from a $ReS_2$ thin film assembled from solution. The PL spectrum possesses an emission doublet at ~1.47 eV (red Voigt fitted line) and ~1.60 eV (green Voigt fitted line), presumably related to PL emission from thick and thin nanosheets. These results are consistent with previous reports that have shown that the PL emission from $ReS_2$ blue-shifts in the ultrathin limit due to quantum confinement effects. Solution-based photoluminescence excitation (PLE) mapping is shown in FIG. 3B for excitation wavelengths ranging from 400 nm to 540 nm and emission wavelengths ranging from 600 nm to 1000 nm. The emission peak at ~758 nm (~1.64 eV) for the $ReS_2$ solution likely differs from the peak position for the thin film sample (FIG. 3A) due to differences in the surrounding dielectric environment.

Figure 3A:
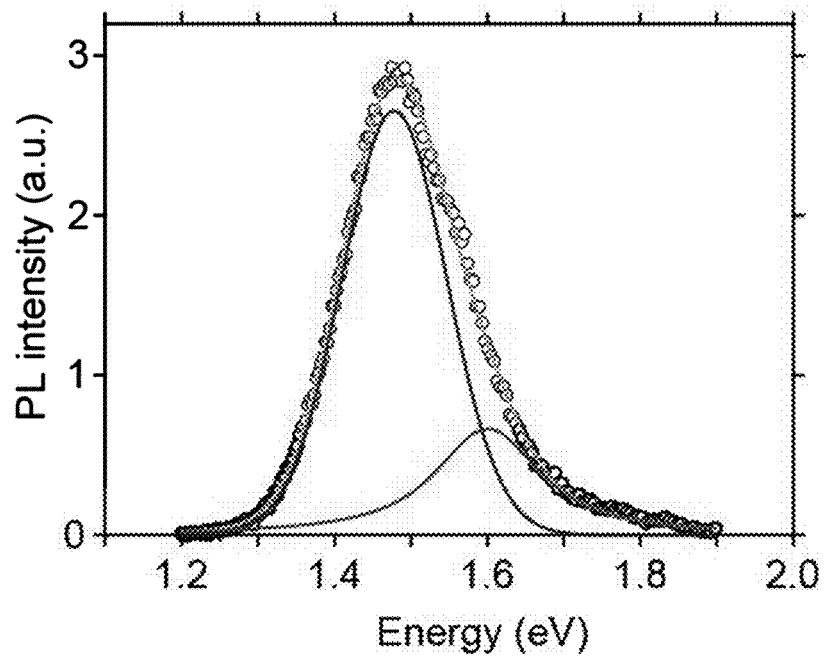
FIGS. 3A-D. (A) Solid-state PL spectrum of assembled $ReS_2$ thin films. Two Voigt fitted curves at 1.47 eV (red) and 1.60 eV (green) indicate contributions from thick and thin nanosheets. (B) Liquid-phase photoluminescence excitation (PLE) plot of a $ReS_2$ dispersion showing an emission peak at 757 nm. The water O—H Raman mode is the linear feature in the upper left corner of the PLE plot. (C) Wavelength-dependent I-V characteristics of a $ReS_2$ thin film device in the dark and under illumination (L=5 µm, W=4380 µm). The spot size of the Gaussian beam is ~0.36 mm². Inset: optical image of the interdigitated electrode array preceding $ReS_2$ thin film transfer. (D) Normalized photocurrent ($I_{pc}$) versus wavelength (blue: $V_d$=−50 V, red: $V_d$=50 V).
Figure 3B:
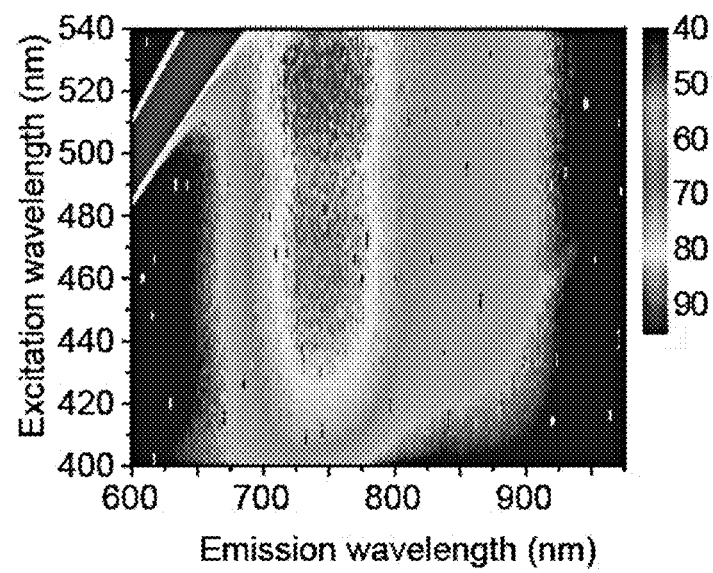
Figure 3C:
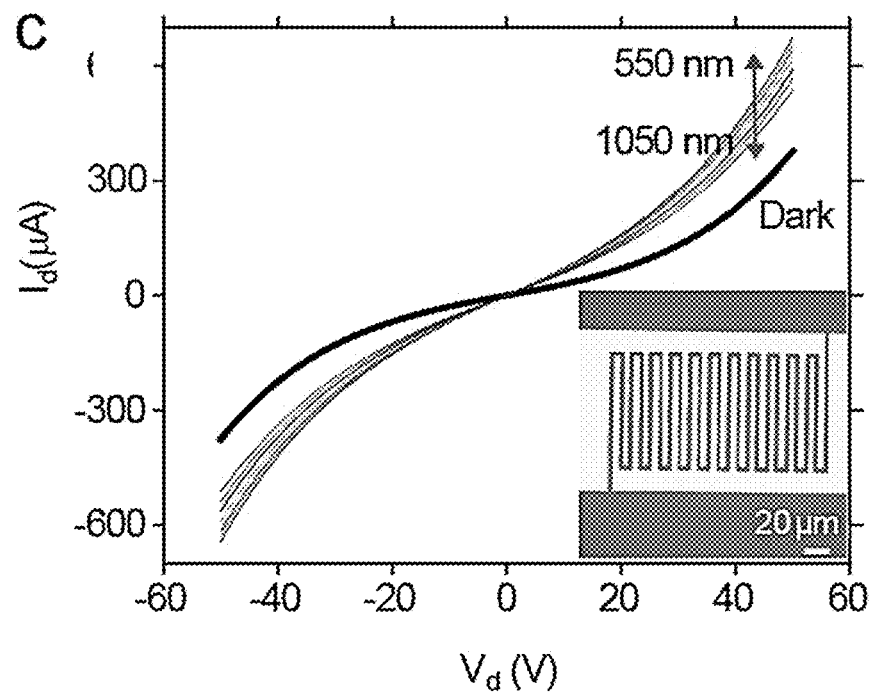
Figure 3D:
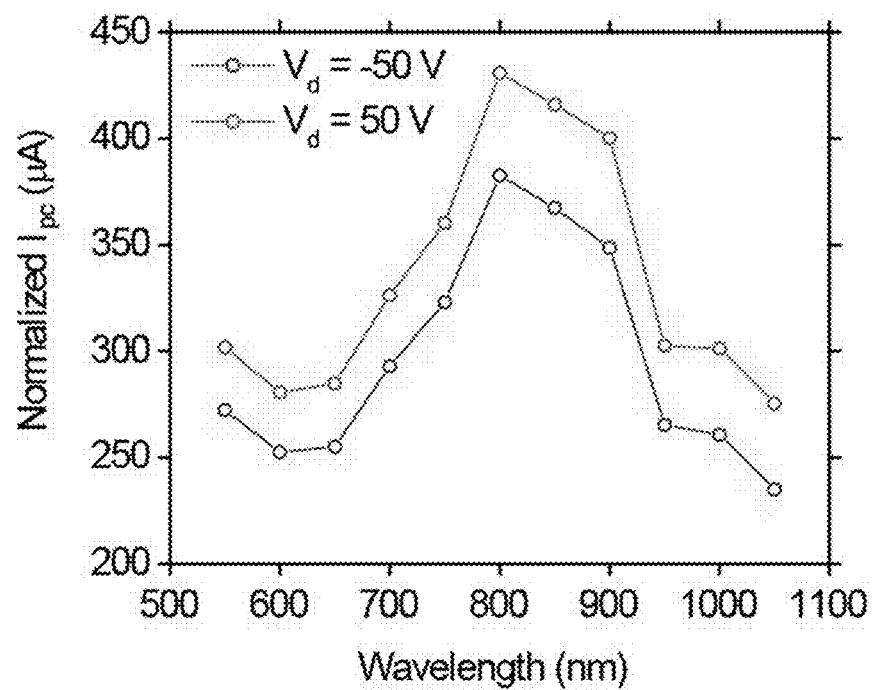
Figure 4A:
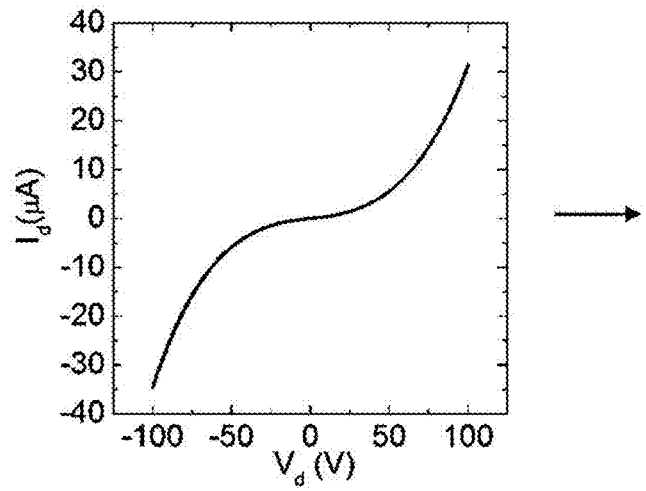
FIGS. 4A-B. I-V curve of a $ReS_2$ thin film before (A) and after (B) annealing at 100° C. for 10 min in ambient conditions.
Figure 4B:
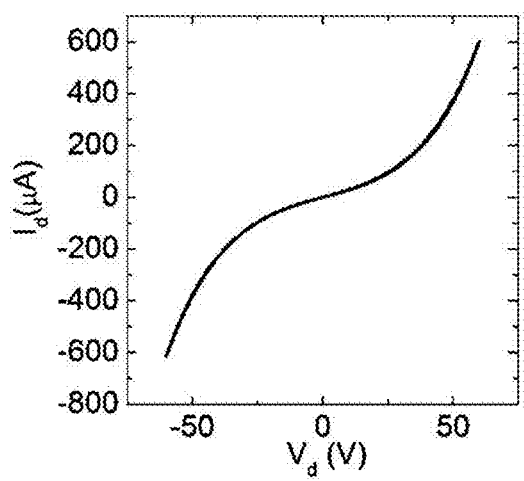
Figure 5:
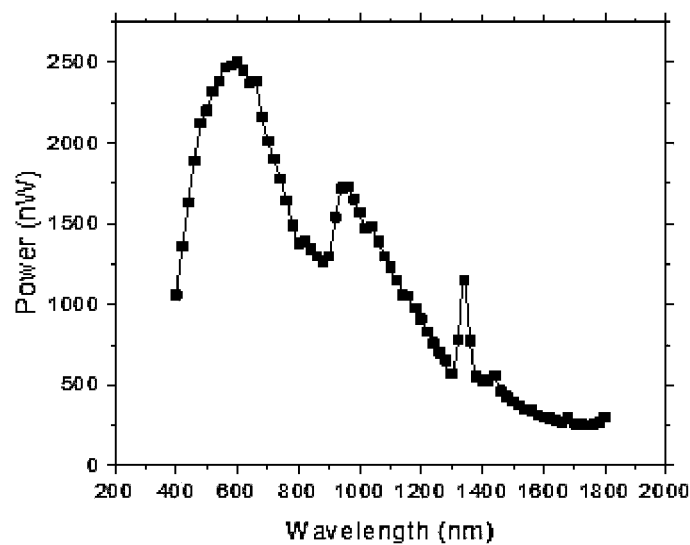
FIG. 5. Output power spectrum for the xenon lamp obtained through the monochromator and fiber cable.

Charge transport measurements are performed on the $ReS_2$ thin films to verify that electronic and photoconductive properties are preserved following solution processing. Bottom-contacted $ReS_2$ devices are fabricated with interdigitated electrodes on thermally oxidized Si wafers (inset of FIG. 3C) and then annealed in ambient conditions at ~100° C. for ~10 min to improve flake-flake contacts. Symmetric, linear current-voltage (I-V) output characteristics at low biases suggest Ohmic contact between the Au electrodes and the $ReS_2$ thin film (FIG. 4). Non-linearity in I-V curves at high bias can be attributed to space-charge limited transport. Transfer characteristics reveal negligible gating (on/off ratio ~1.1) due to high screening and thus weak field penetration in this film (thickness: 206±23 nm). Nevertheless, the measured sheet conductivity of 1.65×10$^{-2}$ S/m is among the highest reported for solution-processed nanomaterial thin films and exceeds that of solution-processed MoS$_2$ thin films by 8 orders of magnitude. FIG. 3C compares the wavelength-dependent dark and illuminated output characteristics for a ReS$_2$ thin film device from 550 nm to 1050 nm. FIG. 3D shows the photocurrent ($I_{pc}=I_{light}-I_{dark}$) as function of wavelength at $V_d=-50$ V and 50 V. The $I_{pc}$ curves are normalized to an incident power of ~1 µW for all wavelengths (starting power fluence is 5×10$^5$ W/m$^2$) by accounting for the measured power spectrum of the Xe arc discharge lamp irradiation source (FIG. 5). The resulting photocurrent shows a peak at ~800 nm in agreement with the optical absorbance (FIG. 1B) and PL measurements (FIG. 3A-B).

Figure 6A:
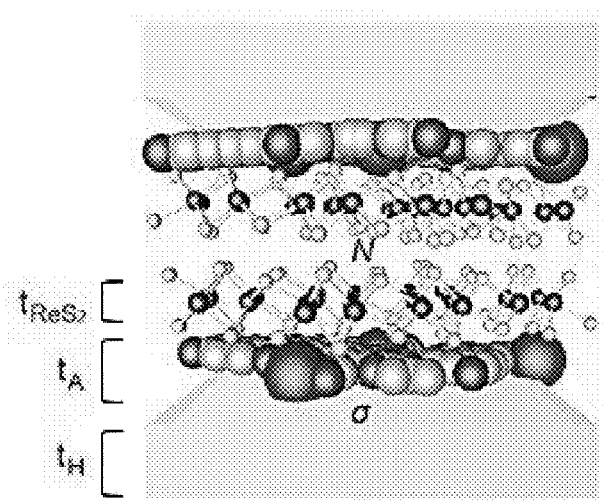
FIGS. 6A-C. (A) Buoyant density model for SC-encapsulated $ReS_2$ in aqueous solution, where N is the number of $ReS_2$ layers, $t_{ReS2}$ is the thickness of a $ReS_2$ layer, $t_A$ is the anhydrous layer thickness, $t_H$ is the hydration shell thickness, and σσ is the packing density. (B) Buoyant density as a function of $ReS_2$ layer number. The black line represents the expected buoyant density when $ReS_2$ is encapsulated with SC in water. The red and green lines indicate the density limit of iodixanol and CsCl, respectively. (C) Density profiles of different density gradient media after ultracentrifugation.
Figure 6B:
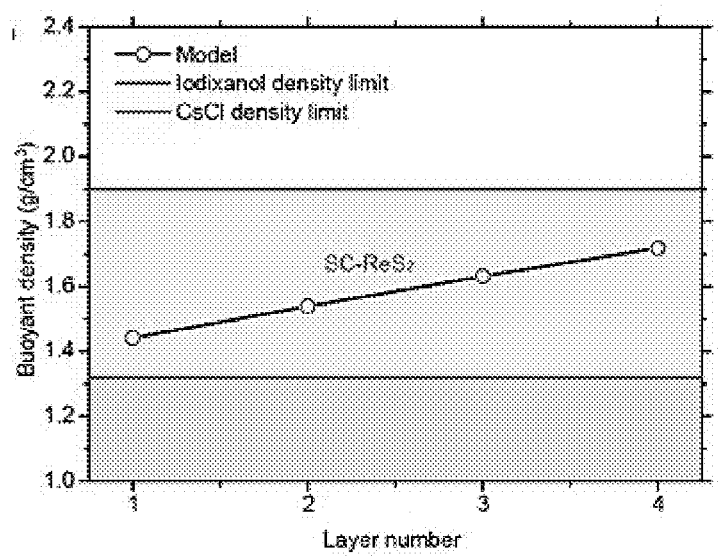

While the aforementioned results show that ReS$_2$ can be effectively exfoliated using aqueous surfactant solutions, the resulting ReS$_2$ nanoflakes are polydisperse with respect to thickness and layer number. Consequently, it is an objective of this invention to adapt iDGU to the high-density limit in order to achieve layer-by-layer sorting of ReS$_2$. Towards this end, FIG. 6A shows a geometrical buoyant density model that allows the constraints on the density gradient medium for ReS$_2$ iDGU to be determined. Specifically, the density profile for SC-encapsulated ReS$_2$ is given by:

$$\rho(N) = \frac{\rho_S N + 2m_{sc}\sigma + 2\rho_{H_2O} t_H}{(N+1)t_{ReS_2} + 2t_A + 2t_H} \quad (1)$$

$$= \frac{\rho_S N + 2m_{sc}\sigma + 2\rho_{H_2O} t_H}{(N+1)t_{ReS_2} + 2\sigma V_{sc} + 2t_H} \quad (2)$$

where $\rho_{ReS2}=3.41\times10^{-7}$ g/cm$^2$ is the sheet density of ReS$_2$, $m_{sc}=7.15\times10^{-22}$ g is the mass of one SC molecule, a is the surface packing density of SC on a ReS$_2$ nanosheet, $p_{H2O}=1$ g/mL is the density of water, $t_H$ is the equivalent hydration shell thickness, and $t_A=\sigma V_{SC}$ is the equivalent anhydrous shell thickness of SC. The calculated buoyant density as a function of ReS$_2$ layer number is shown in FIG. 6B. Evidently, SC-encapsulated ReS$_2$, even for monolayers, is predicted to possess a buoyant density than exceeds the iodixanol density limit ($\rho_{max}=1.32$ g/cm$^3$), but is less than the CsCl density limit ($\rho_{max}=1.9$ g/cm$^3$).

Figure 6C:
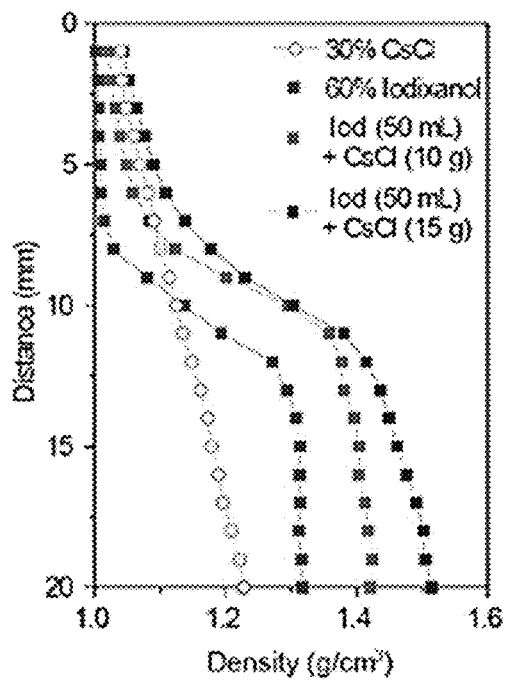
Figure 7A:
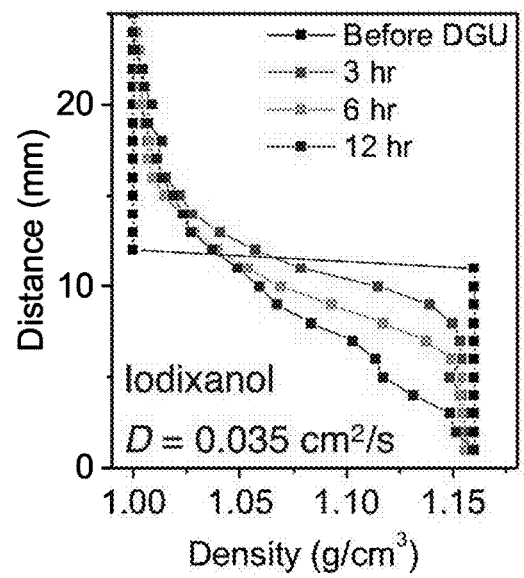
FIGS. 7A-B. Density profiles of (A) iodixanol (diffusion coefficient, D=0.035 cm²/s) and (B) CsCl (D=0.38 cm²/s) before (black) and after 3 hr (red), 6 hr (green), and 12 hr (blue) of density gradient ultracentrifugation (DGU), respectively.
Figure 7B:
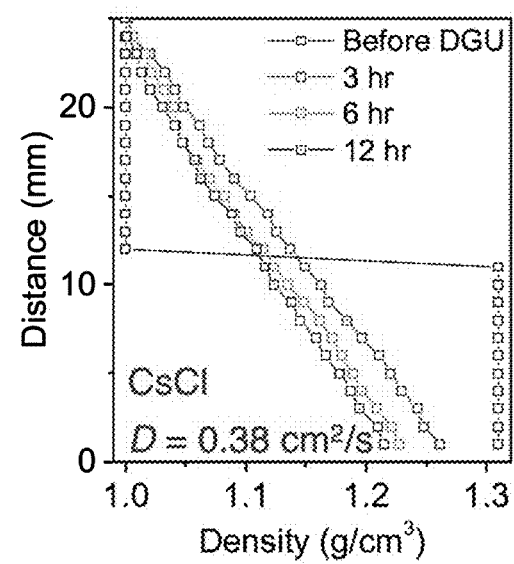
Figure 8A:
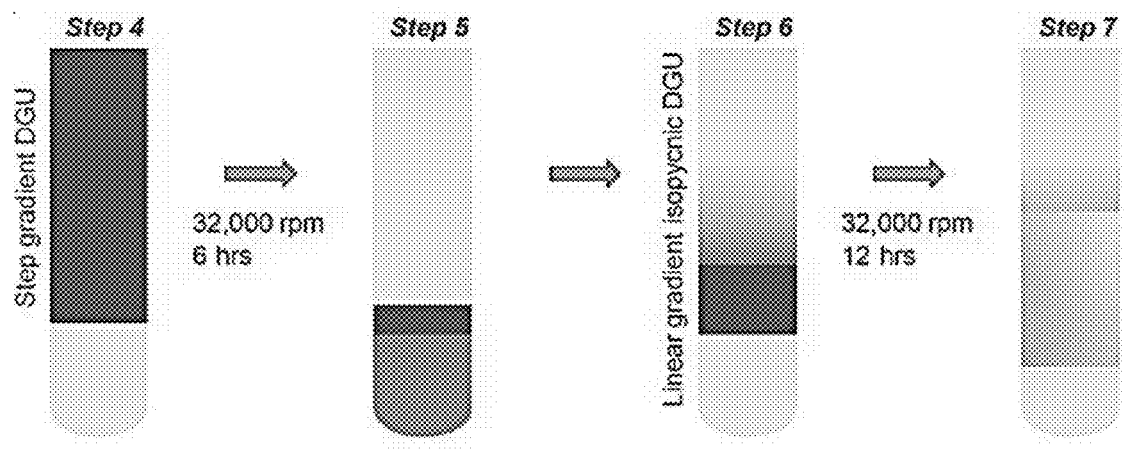
FIGS. 8A-E. (A) $ReS_2$ layer sorting iDGU process flow (digital images). After process steps 1 to 3 (FIG. 1A), the collected $ReS_2$ dispersion is placed onto a step gradient (step 4). After the concentration process (step 5), the $ReS_2$ supernatant is placed in a linear density gradient (step 6). After iDGU, the $ReS_2$ dispersion is separated by thickness and layer number (step 7). (B-E) Centrifuge tube digital images and corresponding density profiles for steps 4 to 7.
Figure 8B:
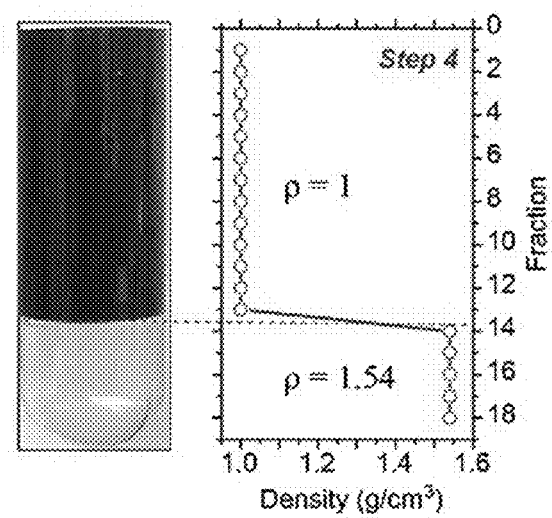
Figure 8C:
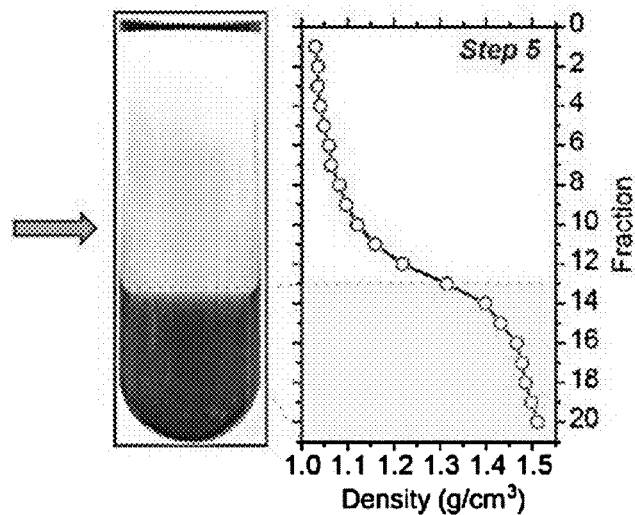
Figure 8D:
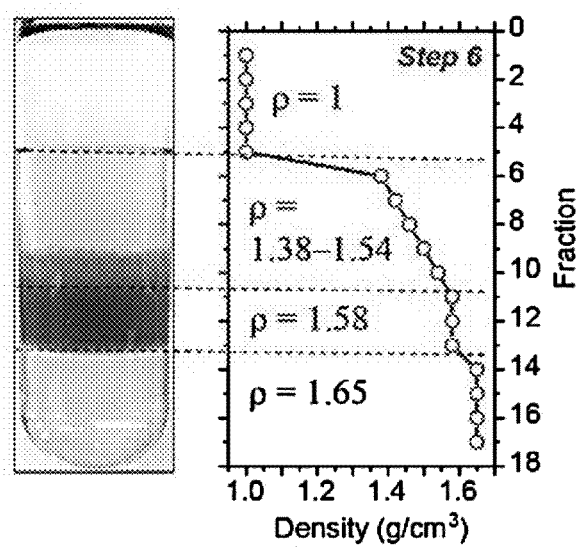
Figure 8E:
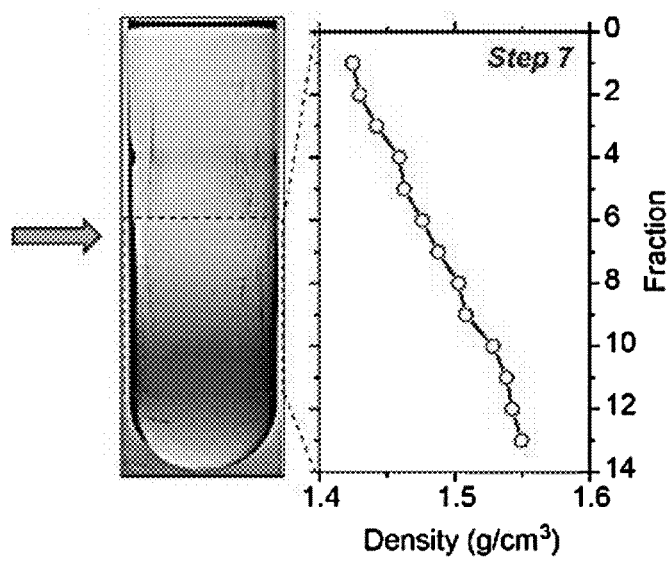
Figure 9A:
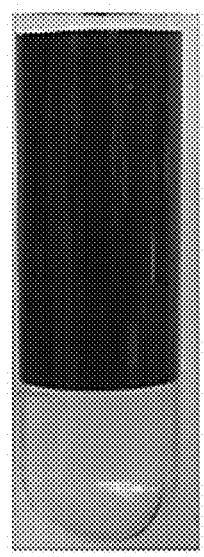
FIGS. 9A-D. (A) A digital image of the product of step 4 (before step gradient DGU). Dark $ReS_2$ dispersion is placed onto the density gradient medium. Digital images of different density gradient medium-surfactant combinations after step 5. (B) Iodixanol (Iod) with Pluronic F68. Pluronic F68 is utilized to reduce the buoyant density by increasing the hydration layer thickness. (C) Iod and CsCl mixture with Pluronic F68. A density of 1.54 g/cm$^3$ is obtained by mixing 50 mL of iodixanol with 15 g CsCl. White unstable precipitates are observed due to the low water solubility of Pluronic F68 (~10% at room temperature). (D) Iod and CsCl mixture with sodium cholate (SC). The water solubility of SC is ~40% at room temperature, providing a stable dark brown $ReS_2$ dispersion after step 5.
Figure 9B:
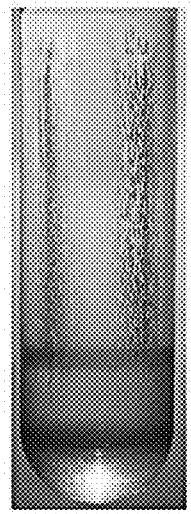
Figure 9C:
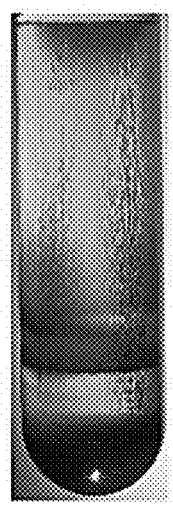
Figure 9D:
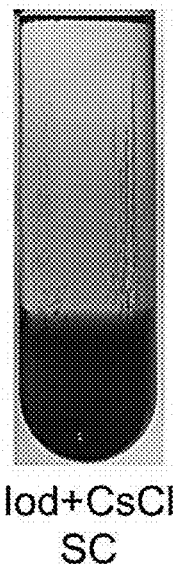

While CsCl has sufficiently high density for ReS$_2$ iDGU, the diffusion coefficient of CsCl (~0.38 cm$^2$/s) in aqueous solution is 10× higher than that of iodixanol (~0.035 cm$^2$/s) at room temperature; which implies that a linear gradient is formed throughout the entire solution after fewer than 3 hours of ultracentrifugation (FIG. 7). This observation is consistent with the Lamm equation, which describes the time evolution of the density profile ($d\chi\chi/dt$):

$$\frac{d\chi}{dt} = \frac{1}{r}\frac{d}{dr}\left[rD\frac{d\chi}{dr} - s\omega^2 r^2 \chi\right] \quad (3)$$

where r is the distance from the center of rotation, t is time, s is the sedimentation coefficient, D is the diffusion coefficient, and cow is the rotor angular velocity. (Brown, P. H.; Schuck, P. *Comput. Phys. Commun.* 2008, 178, 105-120.) To further illustrate the differences between CsCl and iodixanol, FIG. 6C compares the experimental density profiles of CsCl (linear) and iodixanol (nonlinear). Since nonlinear density gradient profiles provide the best sorting efficacy, an adjuvant component such as CsCl cannot be used directly as a replacement for iodixanol. In contrast, by forming a mixture between iodixanol and CsCl, FIG. 6C shows that the desirable gradient nonlinearity of iodixanol and the higher maximum buoyant density of CsCl are achieved concurrently.

By utilizing mixtures of iodixanol and CsCl, layer-sorting of ReS$_2$ can be achieved by iDGU as shown in FIG. 8. In particular, ReS$_2$-SC dispersions prepared according to FIG. 1A (steps 1 to 3) are placed in a step density gradient ($\rho=1.54$ g/cm$^3$, step 4) and then ultracentrifuged to yield a concentrated ReS$_2$-SC dispersion (step 5) with buoyant density less than 1.54 g/cm$^3$. Following step 5, the concentrated dispersion is fractionated and then CsCl powder is added to adjust the buoyant density to 1.58 g/cm$^3$ after which the resulting solution is placed at the bottom of a linear density gradient (1.38 to 1.54 g/cm$^3$, step 6). Subsequent ultracentrifugation drives ReS$_2$ layer sorting. (It should be noted that ReS$_2$ dispersions prepared with Pluronic F68 in place of SC precipitate after step 5 due to the low water solubility of the dispersant. Reference is made to FIG. 9). Following iDGU, the ReS$_2$-SC nanosheets form bands at their respective isopycnic points throughout the ultracentrifuge tube (step 7). A piston gradient fractionator is then used to recover the sorted ReS$_2$ in 2 mm steps (a number, n, of separation fractions F; in this instance, F1 to F13). FIGS. 8B-E present photographs of the centrifuge tubes and their respective density profiles for steps 4 to 7.

Figure 10A:
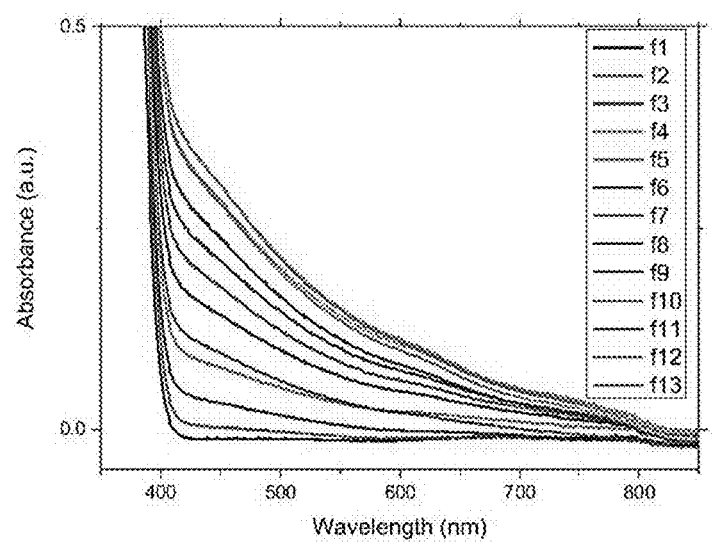
FIGS. 10A-B. (A) Optical absorbance spectra of each fraction (F1-F13) after layer sorting, and (B) the actual concentrations extracted from Beer's law using the extinction coefficient $\alpha=1216$ Lg$^{-1}$ m$^{-1}$.
Figure 10B:
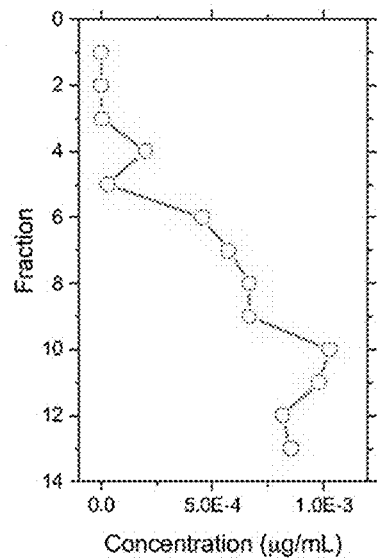
Figure 11A:
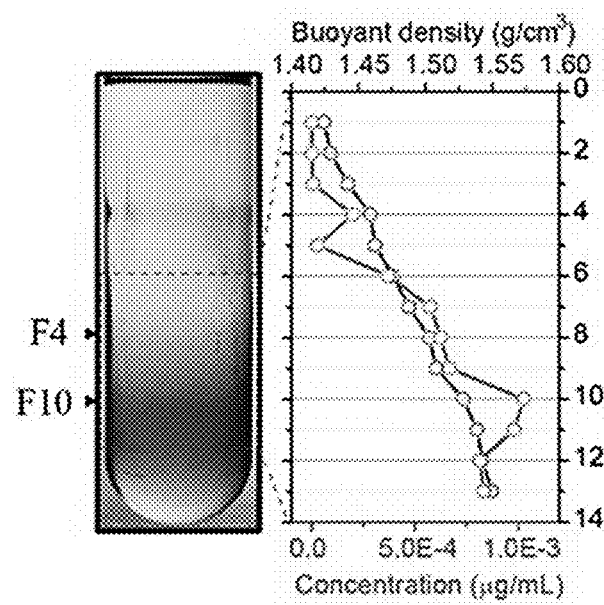
FIGS. 11A-G. (A) $ReS_2$ band separation in a centrifuge tube after iDGU with the buoyant density (blue) and concentration (red) of each fraction. (B) AFM images of $ReS_2$ nanosheets from F4 and F10 on a Si substrate. (C) Fit of the buoyant density model to the experimental data. (D-E) Thickness and area histograms extracted from AFM measurements for F4 (red), F10 (green), and sedimented $ReS_2$ (blue) with Gaussian fitting curves. (F) Raman spectra measured on F4, F10, sedimented $ReS_2$, and concentrated $ReS_2$. (G) PL spectra obtained from F4 (red), F10 (green), and sedimented $ReS_2$ (blue) with overlaid Voigt fitting curves. The peak positions are at 1.58 eV (red), 1.53 eV (green), and 1.51 eV (blue).
Figure 11B:
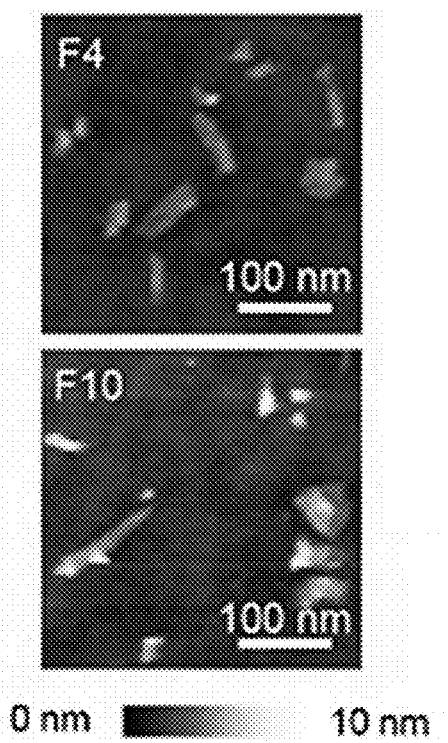
Figure 11C:
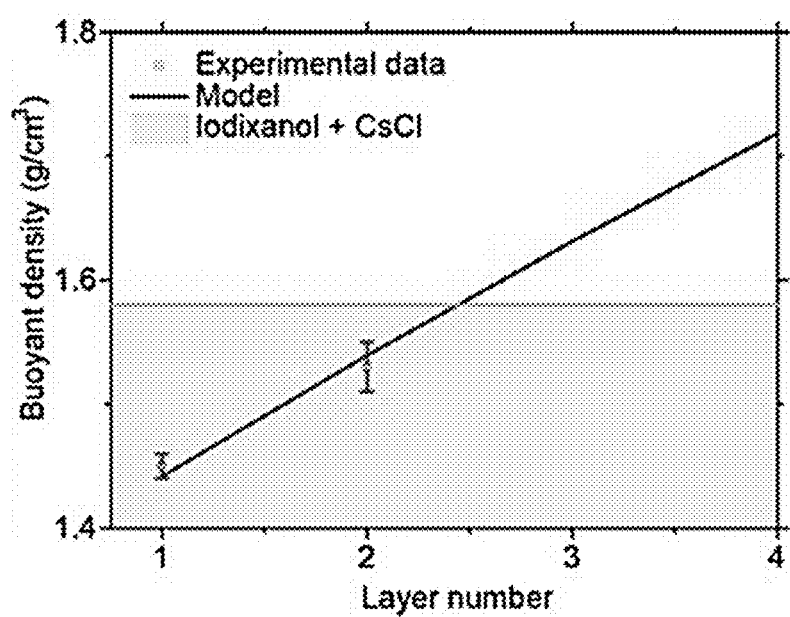
Figure 11D:
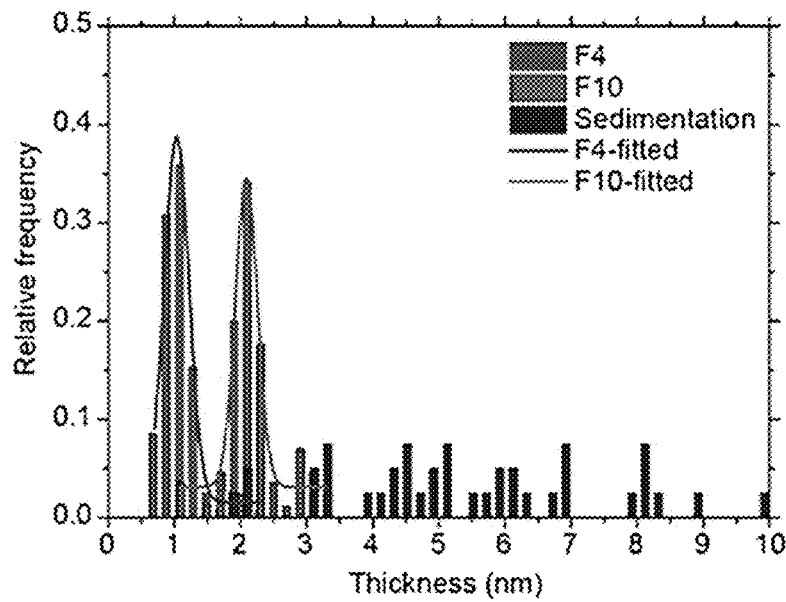
Figure 11E:
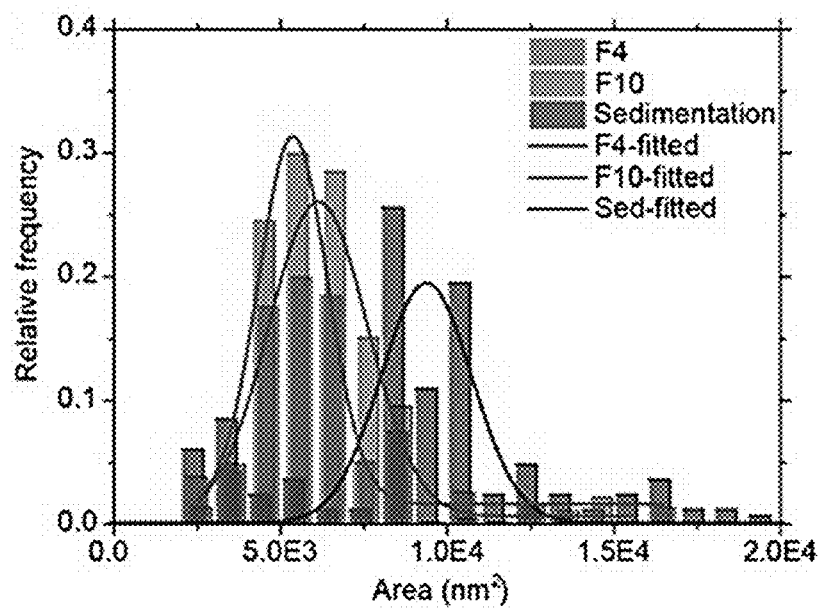

Following iDGU, optical absorbance spectra for fractions F1 to F13 are measured (FIG. 10), and used to extract the ReS$_2$ concentration using Beer's law. In FIG. 11A, these concentration results (red line) along with the buoyant density (blue line) are plotted against fraction number. Fractions F4 and F10 have a higher concentration than adjacent fractions, consistent with the band positions in the photograph of FIG. 11A. FIG. 11B shows AFM images of F4 and F10 with average thickness values of 1.03±0.11 nm and 2.09±0.09 nm, respectively. The measured thicknesses are slightly larger than previously reported values for monolayer and bilayer ReS$_2$, likely due to residual hydration layers and surfactants. On the basis of the measured thickness and buoyant density values, the ReS$_2$ experimental data are plotted with the geometrical buoyant density model in FIG. 11C. By fitting the density model to the experimental data, the values of σ and $t_H$ are determined to be σ=1.4×10$^{15}$ cm$^{-2}$ and $t_H$=5.5 nm, respectively. The thickness and area histograms for F4 (red), F10 (green), and sedimented ReS$_2$ (blue) with Gaussian fits are shown in FIGS. 11D-E, indicating that ReS$_2$ separation is driven by thickness instead of lateral size as expected for iDGU.

Figure 11F:
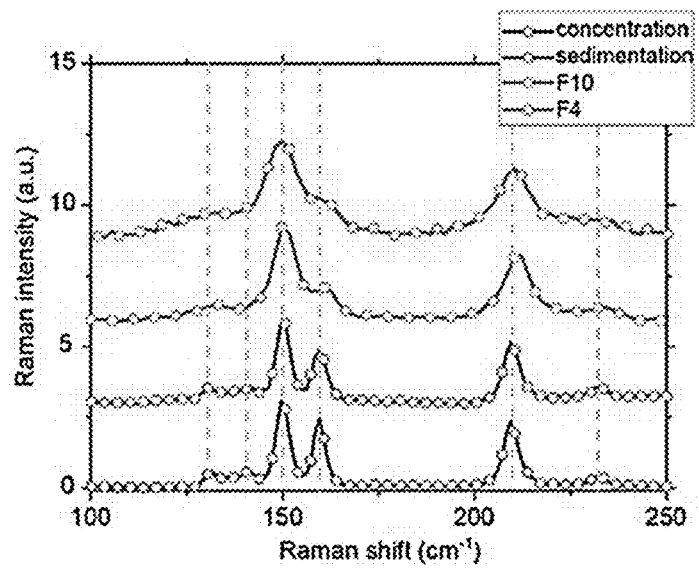
Figure 11G:
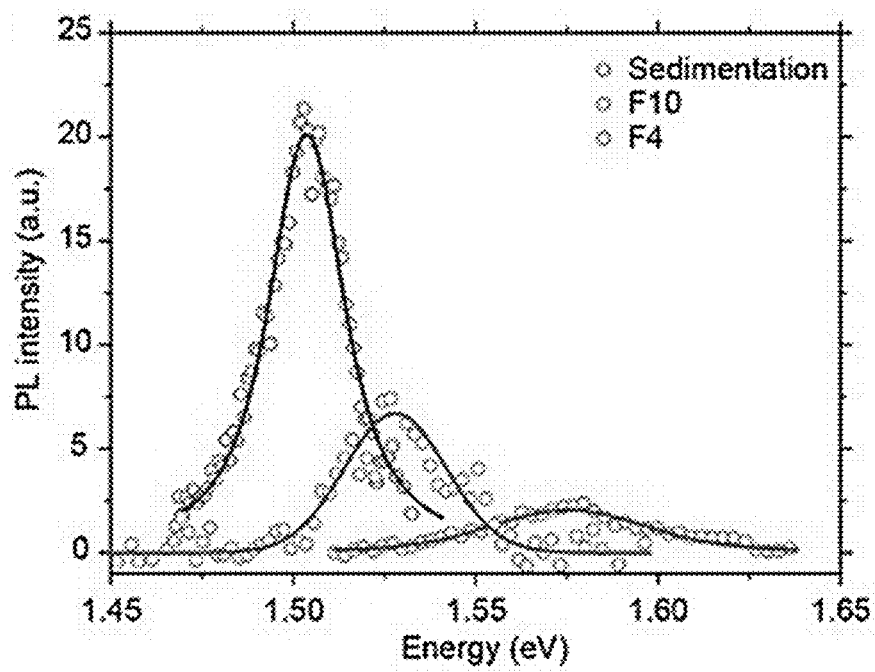

F4, F10, sedimented ReS$_2$, and concentrated ReS$_2$ are further examined by Raman and PL spectroscopy in FIGS. 11F-G. The Raman spectra indicate that the weak interlayer interaction for ReS$_2$ results in a decoupling of lattice vibration modes. In particular, no noticeable peak shift with layer number is observed, in contrast to thickness-dependent MoS$_2$ Raman modes. However, the peak intensity of the IV mode ("in-plane", $E_{2g}$-like) is decreased and the V mode ("out-of-plane", $A_{1g}$-like) is stiffened by ~2 cm$^{-1}$ with decreasing layer number, consistent with previous results. The PL spectra for F4, F10, and sedimented ReS$_2$ occur at 1.58 eV (red), 1.53 eV (green), and 1.51 eV (blue), respectively, which is expected based on previous reports that found ReS$_2$ layer-dependent quantum confinement effects. Compared to other TMDCs such as MoS$_2$ and WS$_2$, the PL emission energy for ReS$_2$ possesses a weaker thickness dependence, which further supports the weak interlayer interactions that have been postulated for ReS$_2$.

EXAMPLES OF THE INVENTION

The following non-limiting examples and data illustrate various aspects and features relating to the methods and/or density gradient media of the present invention, including the sorting of high density 2D nanomaterials. In comparison with the prior art, the present methods and media provide results and data which are surprising, unexpected and contrary thereto. While the utility of this invention is illustrated through the use of several 2D nanomaterials, density gradient media, media adjuvant components and surface active components which can be used therewith, it will be understood by those skilled in the art that comparable results are obtainable with various other nanomaterials, media, media adjuvant components and surface active components, as are commensurate with the scope of this invention.

Example 1

ReS$_2$ Dispersion Preparation.

0.5 g of ReS$_2$ powder (American Elements) and 90 mL of 2% w/v sodium cholate (SC, Sigma Aldrich) surfactant aqueous solution were placed in a 120 mL stainless steel beaker. The mixture was ultrasonicated (Fisher Scientific Model 500 Sonic Dismembrator) with a 0.5-inch diameter flat tip for 2 hours at a power level of ~70 W in an iced bath (step 1). The as-prepared ReS$_2$ dispersion was centrifuged at 7,500 rpm (Avanti J-26 XP, Beckman Coulter) for 10 min to remove unexfoliated ReS$_2$ powder (step 2). Following the centrifugation, the supernatant was carefully decanted and ultracentrifuged at 20,000 rpm for 30 min using a SW32Ti rotor (Optima L-80 XP, Beckman Coulter) to collect large nanosheets (step 3). The sediment was redispersed in 10 mL of 2% w/v SC solution by bath sonication for 30 min.

Example 2

Figure 12:
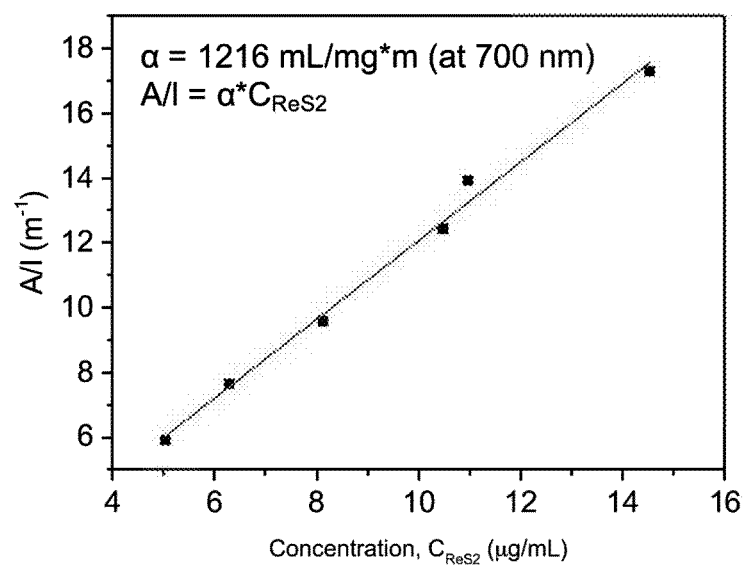
FIG. 12. The extinction coefficient of $ReS_2$ dispersion is obtained to be 1216 Lg$^{-1}$ m$^{-1}$ by plotting the absorbance per length (A/l) at 700 nm versus the concentration of $ReS_2$.

Optical absorbance spectroscopy. Optical absorbance spectra of the ReS$_2$ dispersion were measured using a Cary 5000 spectrophotometer (Agilent Technologies). A cuvette with 1 cm path length was used for the measurement, and the baseline from the surfactant solution was subtracted from the spectra. To extract the ReS$_2$ extinction coefficient, different volumes of ReS$_2$ dispersion after step 3 were collected by vacuum filtration on an anodized alumina (AAO) membrane with ~20 nm pore size and rinsed with ~50 mL of deionized water to remove the surfactant. The actual concentration of ReS$_2$ nanosheets was calculated from the weight difference on the AAO membrane before and after filtration. Using Beer's law, the ReS$_2$ extinction coefficient α was extracted from the slope of a plot of A/l with respect to the ReS$_2$ concentration (FIG. 12).

Example 3

Raman/Photoluminescence (PL) Spectroscopy.

Raman/PL spectra of ReS$_2$ nanosheets filtered on an AAO membrane were collected using a Horiba Xplora Raman/PL system with an excitation wavelength of 532 nm. The signal was collected for 30 sec using a 100× objective with a 2400 gr/mm grating for Raman spectra and a 600 gr/mm grating for PL spectra.

Example 4

Photoluminescence Excitation (PLE) Spectroscopy.

The ReS$_2$ sediment after step 3 was redispersed in deionized water without surfactant to minimize the surfactant concentration. PLE mapping for the resulting ReS$_2$ dispersion was obtained using a Horiba Fluorolog-3 spectrofluorometer. Each line spectrum was collected using solutions in a quartz cuvette with an acquisition time of 6 sec and a 10 nm slit width.

Example 5

Atomic force microscopy (AFM).

Si substrates were rinsed with acetone and isopropyl alcohol (IPA) and immersed in diluted (3-aminopropyl)-triethoxysilane (APTES) solution to promote nanosheet adhesion. ReS$_2$ dispersion was dropcasted and dried on the pre-annealed substrate at 80° C. for 10 min. After the dispersion was fully dried, the substrate was mildly rinsed with deionized water to remove surfactant. The substrate was loaded on an Asylum Cypher AFM with Si cantilevers (~290 kHz resonant frequency), and AFM images were obtained in tapping mode at a scanning rate of ~0.4 Hz using a minimum of 512 pixels per line.

Example 6

Transmission Electron Microscopy (TEM).

A droplet of ReS$_2$ dispersion was deposited on a holey carbon TEM grid (Ted-Pella) and dried with N$_2$. TEM images were acquired using a JEOL JEM-2100 with an accelerating voltage of 200 keV under a TEM column pressure of ~$10^{-7}$ Torr.

Example 7

X-Ray Photoelectron Spectroscopy (XPS).

XPS measurements were performed using a high vacuum Thermo Scientific ESCALAB 250 Xi XPS system at a base pressure of ~$1\times10^{-9}$ Torr. The XPS data had a binding energy resolution of ~0.1 eV using a monochromated Al K$_\alpha$ X-ray source at ~1486.7 eV (~400 μm spot size). All core-level spectra were the average of five scans taken at a 100 ms dwell time using a pass energy of 15 eV. When using charge compensation, all core levels were charge-corrected to adventitious carbon at ~284.8 eV. Up to 25 nm deep depth profiles were made in the ReS$_2$ thin films using a 3000 keV ion gun (ca. 0.40 nm/s etch rate). Using the software suite Avantage (Thermo Scientific), all subpeaks were determined in a manner detailed in the literature.

Example 8

ReS$_2$ Thin Film Transfer for Photocurrent Measurements

ReS$_2$ films were prepared using vacuum filtration. 4 mL of ReS$_2$ dispersion prepared by steps 1 to 3 in FIG. 1A was diluted in ~50 mL of deionized water and filtered through an anodized alumina (AAO) membrane with 20 nm pore size (Anodisc, Whatman™). The residual surfactant was then rinsed with ~100 mL of deionized water.

Separately, electrodes were patterned on thermally oxidized silicon wafers (300 nm thick SiO$_2$) by photolithography. Interdigitated electrodes (3 nm Ti/70 nm Au) were fabricated with varying channel length and width. ReS$_2$ films prepared by vacuum filtration were transferred onto the electrode patterns. In particular, the films were first floated onto 3 M NaOH for 3 hours to etch the AAO membrane, neutralized with deionized water, and then transferred on the device substrate with interdigitated Au electrodes. The resulting film was subjected to an anneal at 80° C. for 30 min to dry the residual water.

Example 9

Electrical and Photocurrent Measurement.

All ReS$_2$ devices were measured at room temperature under vacuum (pressure <5×10$^{-5}$ Torr) using a probe station (LakeShore CRX 4K) equipped with Keithley source-meters and home-built LabView programs. Spectrally resolved light illumination was achieved by a 250 W Xenon arc discharge lamp coupled with a monochromator (Newport 74125). Light was focused into the input slit of the monochromator by a lens (Thor Labs) to increase the net power output. The monochromator was connected to the probe station via a fiber optic cable. The highest power (at wavelength of 600 nm) at the end of the fiber cable terminating inside the vacuum chamber was measured to be 2.5 µW by a power meter fitted with a silicon photodiode (Thor Labs). FIG. 5 shows the power spectrum of the output light from the fiber cable. The linewidth of the spectrally resolved light was measured to be ~20 nm, independent of wavelength. Photocurrent measurements were conducted by measuring DC current-voltage characteristics in dark and under illumination ($I_{photocurrent} = I_{light} - I_{dark}$). The photocurrent was normalized with respect to the lamp power spectrum to ensure that the effective incident light power was 1 µW at all wavelengths. For photoconductivity measurements, ReS$_2$ were annealed at ~100° C. for ~10 min in ambient to improve overall conductivity. FIG. 4 shows the change in the I-V characteristics upon annealing.

Example 10

Thickness Sorting of ReS$_2$ Nanosheets.

After step 2 of the ReS$_2$ dispersion preparation process in FIG. 1A, the sediment from unexfoliated ReS$_2$ powder was re-sonicated for further exfoliation. After five iterations of this recycling process, 28 mL of as-prepared ReS$_2$ dispersion was placed onto 10 mL of density gradient medium (density of 1.54 g/cm$^3$) with 2% w/v SC (step 4). The density gradient medium was prepared by mixing 50 mL of iodixanol with 15 g of CsCl powder. The resulting step gradient was ultracentrifuged for 6 hours at 32,000 rpm and 22° C. (step 5).

Following step 5, the concentrated ReS$_2$ dispersion was recovered in 1 mm steps using a piston gradient fractionator (BioComp Instruments). After the density of concentrated ReS$_2$ dispersion was modified to 1.58 g/cm$^3$ by adding CsCl powder, this dispersion was placed between a linear density gradient (density of 1.38 to 1.54 g/cm$^3$) and a step gradient (density of 1.65 g/cm$^3$) (step 6), and then thickness sorting of ReS$_2$ was carried out via isopycnic density gradient ultracentrifugation (iDGU) for 12 hr at 32,000 rpm and 22° C. (step 7).

For the microscopic and spectroscopic analysis, the layer-sorted ReS$_2$ dispersion was recovered in 2 mm steps using a piston gradient fractionator. These fractions were labeled as Fn, where n increases with the order of recovery from the top. The recovered fractions were placed in a dialysis cassette (20,000 molecular weight cutoff, Thermo Scientific) and dialyzed in 750 mL of deionized water bath for 48 hours to remove the density gradient medium and excess SC. Following dialysis, each solution was ultracentrifuged for 1 hour at 41,000 rpm using a SW41Ti rotor (Optima L-80 XP, Beckman Coulter) and then redispersed with 5 mL of deionized water.

Example 11

A variety of surface active components can be effective at dispersing both the three-dimensional starting materials and the exfoliated two-dimensional planar nanomaterials. For example, anionic surfactants such as bile salts and alkali salts of alkyl sulfate and alkyl benzene sulfonate; and cationic surfactants such as quaternary ammonium salts can be useful in accordance with the present teachings. In addition, polymers including cyclic groups in the backbone and/or the side chains such as polyvinylpyrrolidone and carboxymethylcellulose can be useful in conjunction with this invention.

In certain embodiments, surface active components that include one or more planar organic groups can be particularly useful both for effectively dispersing the starting materials and subsequently enabling separation of the nanomaterials by thickness. Without wishing to be bound by any particular theory, it is believed that surface active components which have one or more planar organic groups can intercalate between the layers of the three-dimensional layered materials more effectively, thereby promoting exfoliation and increasing the yield of two-dimensional planar nanomaterials, in particular, monolayer and bilayer nanomaterials. Accordingly, in certain embodiments, the one or more surface active components can include an amphiphilic non-polymeric compound having a planar hydrophobic core and one or more hydrophilic groups. For example, the one or more surface active components can include a compound having a cyclic (e.g., carbocyclic) core and one or more charged groups, particularly, a benzene group or a sterane group and one or more anionic groups selected from hydroxyls, carboxylates, sulfates, sulfonates, and combinations thereof. In particular embodiments, the one or more surface active components can include one or more bile salts and/or an alkali salt of linear alkyl benzenesulfonate such as sodium dodecylbenzenesulfonate. Bile salts can be more broadly described as a group of molecularly rigid and planar amphiphiles with one or more charged groups opposing a hydrophobic face. Examples of bile salts include salts (e.g., sodium or potassium salts) of conjugated or unconjugated cholates and cholate derivatives including deoxycholates, chenodeoxycholates, taurodeoxycholates, glycochenodeoxycholates, ursodeoxycholates, and glycoursodeoxycholates. In certain embodiments, the one or more surface active components can include a polymer having one or more cyclic groups in its backbone and/or side chains. For example, polyvinylpyrrolidones over a large molecular weight range (e.g., between about 5 kDa and about 1500 kDa) have been found useful. It also has been discovered that sodium carboxymethylceluose is particularly effective as a surface active component for dispersing hydrophobic two-dimensional nanomaterials, despite the fact that the glucose rings in the polysaccharide can assume both planar and non-planar configurations. Other surface active components include but are not limited to alkyl sulfates such as sodium hexyl sulfate, sodium octyl sulfate, sodium decyl sulfate, sodium undecyl sulfate, sodium dodecyl sulfate, and lithium dodecyl sulfate; quaternary ammonium salts such as dodecyltrimethylammonium bromide, myristyltrimethylammonium bromide, hexadecyltrimethylammonium bromide, hexadecyltrimethylammonium chloride, and hexadecyltrimethylammonium hydrogen sulfate.

Example 12

Generally, density gradient ultracentrifugation uses a fluid medium with a predefined variation in its density as a function of position within a centrifuge tube or compartment (i.e., a density gradient). Fluid media useful with the present teachings are limited only by nanomaterial aggregation therein to an extent precluding at least partial separation. Accordingly, aqueous and non-aqueous fluids can be used in conjunction with any substance soluble or dispersible therein, over a range of concentrations, so as to provide the medium a density gradient for use in the separation techniques described herein. Such substances can be ionic or non-ionic, non-limiting examples of which include inorganic salts and alcohols, respectively. Such a medium can include a range of aqueous iodixanol concentrations, one or more suitable adjuvant components or additives introduced thereto and the corresponding gradient of concentration densities. As understood by those skilled in the art, aqueous iodixanol is a common, widely used non-ionic density gradient medium. However, other media and components/additives can be used in methods of the present teachings, as would be understood by those skilled in the art.

More generally, any material or compound stable, soluble or dispersible in a fluid or solvent of choice can be used as a density gradient medium. A range of densities can be formed by dissolving such a material or compound in the fluid at different concentrations, and a density gradient can be formed, for instance, in a centrifuge tube or compartment. More practically, with regard to choice of medium, the two-dimensional nanomaterials in composition with the surface active components should be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the nanomaterial-surface active component complexes for a particular medium. Accordingly, any aqueous or non-aqueous density gradient medium can be used provided that the nanomaterials are stable; that is, do not aggregate to an extent precluding useful separation. Alternatives to iodixanol and CsCl include other inorganic salts (such as $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as Percoll☐). Other parameters which can be considered upon choice of a suitable density gradient medium include the diffusion coefficient and the sedimentation coefficient, both of which can determine how quickly a gradient redistributes during centrifugation. Generally, for more shallow gradients, a larger diffusion coefficient and a smaller sedimentation coefficient are desired.

As shown, the present invention demonstrates preparation of stable $ReS_2$-SC aqueous dispersions with concentrations in excess of 0.2 mg/mL. The solution-processed $ReS_2$ nanosheets are characterized with a comprehensive set of microscopic and spectroscopic methods, which confirm that the structure and properties of solution-exfoliated $ReS_2$ are comparable to micromechanically exfoliated $ReS_2$. Furthermore, solution-processed $ReS_2$ thin films show significantly higher electrical conductivity than previously reported solution-processed TMDCs. Additionally, photocurrent measurements on $ReS_2$ thin films show spectroscopic features that are consistent with optical absorbance and PL measurements. Despite the high buoyant density of $ReS_2$, iDGU is used to achieve thickness sorting of $ReS_2$ nanosheets by employing a mixture of iodixanol and CsCl as the density gradient medium. Characterization of the resulting layer-by-layer sorted $ReS_2$ dispersions show weak thickness dependence in the Raman and PL spectra, which confirms weak interlayer coupling in $ReS_2$ compared to other TMDCs. Overall, this work demonstrates effective solution-based exfoliation and thicknesses sorting for $ReS_2$.

We claim:

1. A method for separating planar nanomaterials by thickness, the method comprising:
    centrifuging a rhenium disulfide nanomaterial composition in contact with an aqueous fluid medium comprising a density gradient and an adjuvant component providing said medium a buoyant density greater than the buoyant density of said rhenium disulfide nanomaterial composition, wherein the rhenium disulfide nanomaterial composition comprises one or more surface active components and a polydisperse population of planar rhenium disulfide nanomaterials which is polydisperse at least with respect to thickness and has a mean thickness on the order of nanometers; and
    separating the rhenium disulfide nanomaterial composition into two or more separation fractions each comprising a subpopulation of planar rhenium disulfide nanomaterials from the polydisperse population, wherein the subpopulation of planar rhenium disulfide nanomaterials in at least one of the two or more separation fractions has a mean thickness that is less than the mean thickness of the polydisperse population.

2. The method of claim 1, wherein the planar nanomaterials comprise mono- and bilayer rhenium disulfide nanomaterials.

3. The method of claim 1, wherein the one or more surface active components comprise a planar organic group.

4. The method of claim 3, wherein the one or more surface active components is sodium cholate.

5. The method of claim 1, wherein said aqueous fluid medium comprises iodixanol and an adjuvant component to increase the buoyant density of said medium.

6. The method of claim 5, wherein said adjuvant component is CsCl.

7. A method for separating rhenium disulfide nanomaterials by thickness, the method comprising:
    sonicating a rhenium disulfide material in a first fluid medium to provide a rhenium disulfide nanomaterial composition;
    centrifuging the rhenium disulfide nanomaterial composition in contact with an aqueous second fluid medium comprising a density gradient and an adjuvant component providing said medium a buoyant density greater than the buoyant density of said rhenium disulfide nanomaterial composition, wherein the rhenium disulfide nanomaterial composition comprises one or more surface active components and a polydisperse population of planar rhenium disulfide nanomaterials comprising monolayer, bilayer, trilayer and n-layer rhenium disulfide nanomaterials, where n is an integer in the range of 4 to 10; and
    separating the rhenium disulfide nanomaterial composition into two or more separation fractions each comprising a subpopulation of planar rhenium disulfide nanomaterials from the polydisperse population, wherein the subpopulation in at least one of the two or more separation fractions comprises greater than about 50% of the monolayer rhenium disulfide nanomaterials, bilayer rhenium disulfide nanomaterials, trilayer rhenium disulfide nanomaterials, or combinations thereof.

8. The method of claim 7, wherein the subpopulation in at least one of the two or more separation fractions comprises greater than about 50% of the monolayer or bilayer rhenium disulfide nanomaterials, or a combination thereof.

9. The method of claim 7, wherein the one or more surface active components comprise a compound having a planar organic group.

10. The method of claim 8, wherein the one or more surface active components is sodium cholate.

11. The method of claim 7, wherein the subpopulation in one of the separation fractions comprises greater than about 50% of the monolayer rhenium disulfide.

12. The method of claim 7, wherein said second aqueous fluid medium comprises iodixanol and CsCl.

13. The method of claim 12, wherein the subpopulation in one of the separation fractions comprises greater than about 50% of the monolayer rhenium disulfide and is deposited on the substrate.

14. The method of claim 13, wherein the substrate and rhenium disulfide deposited thereon are incorporated into an electronic device.

15. The method of claim 7, wherein a subpopulation of at least one of the two or more separation fractions is deposited on a substrate.

16. A method for separating monolayer rhenium disulfide nanomaterials, the method comprising:
centrifuging a rhenium disulfide nanomaterial composition in contact with an aqueous fluid medium comprising iodixanol and CsCl, said medium having a density gradient, wherein the rhenium disulfide nanomaterial composition comprises sodium cholate and a polydisperse population of planar rhenium disulfide nanomaterials comprising monolayer, bilayer and trilayer rhenium disulfide nanomaterials; and
separating the rhenium disulfide nanomaterial composition into two or more separation fractions each comprising a subpopulation of planar rhenium disulfide nanomaterials from the polydisperse population, wherein the subpopulation in one of the two or more separation fractions comprises greater than about 50% of the monolayer rhenium disulfide nanomaterials.

17. The method of claim 16, wherein a subpopulation of at least one of the two or more separation fractions is deposited on a substrate.

18. The method of claim 17, wherein the subpopulation in one of the separation fractions comprises greater than about 50% of the monolayer rhenium disulfide and is deposited on the substrate.

19. The method of claim 18, wherein the substrate and rhenium disulfide deposited thereon are incorporated into an electronic device.

20. The method of claim 16, wherein said fluid medium and said sodium cholate are removed from a said separation fraction.

21. A method of using an increased buoyant density limit for separating planar nanomaterials by thickness, the method comprising:
providing a composition comprising a nanomaterial and one or more surface active components, said composition comprising a polydisperse population of planar nanomaterials comprising monolayer, bilayer, trilayer and n-layer nanomaterials, where n is an integer selected from 4-about 10, said composition having a buoyant density;
providing an aqueous fluid medium comprising a density gradient, said medium having a maximum buoyant density;
introducing a component to said medium, said component having a maximum density limit greater than said composition buoyant density, to provide said medium a buoyant density greater than said composition buoyant density;
centrifuging said nanomaterial composition in contact with said aqueous fluid medium; and
separating said nanomaterial composition into two or more separation fractions each comprising a subpopulation of planar nanomaterials from the polydisperse population, wherein the subpopulation of planar nanomaterials in at least one of the two or more separation fractions comprises a greater population of the monolayer nanomaterials, bilayer nanomaterials, or a combination thereof as compared to adjacent separation fractions;
wherein said nanomaterial is rhenium disulfide.

22. The method of claim 21 wherein the planar nanomaterials comprise mono- and bi-layer rhenium disulfide nanomaterials.

23. The method of claim 21 wherein the one or more surface active components comprise a planar organic group.

24. The method of claim 23 wherein the one or more surface active components is sodium cholate.

25. The method of claim 21 wherein said aqueous fluid medium comprises iodixanol.

26. The method of claim 25 wherein said component introduced to said fluid medium is CsCl.

27. The method of claim 21 wherein a subpopulation of at least one of the two or more separation fractions is deposited on a substrate.

28. The method of claim 27 wherein a substrate and rhenium disulfide deposited thereon are incorporated into an electronic device.

* * * * *